Figure 1:
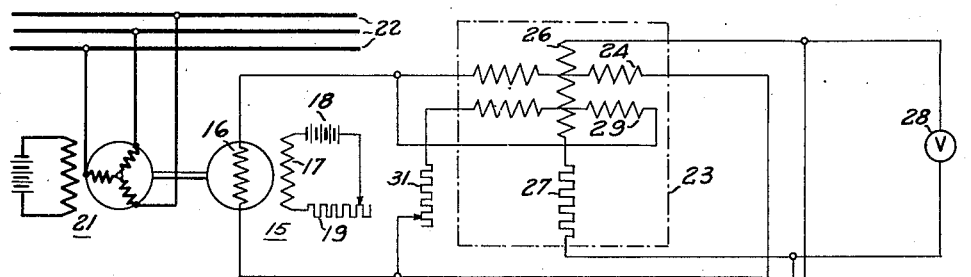

Sept. 8, 1936.　　　D. JOURNEAUX　　　2,054,020

MAGNETIC SHEET TESTER

Filed Oct. 14, 1932　　　3 Sheets-Sheet 1

Inventor
D. Journeaux
by
Attorney

Sept. 8, 1936.   D. JOURNEAUX   2,054,020
MAGNETIC SHEET TESTER
Filed Oct. 14, 1932   3 Sheets-Sheet 3

Patented Sept. 8, 1936

2,054,020

UNITED STATES PATENT OFFICE 2,054,020

MAGNETIC SHEET TESTER

Didier Journeaux, Wauwatosa, Wis., assignor to Allis-Chalmers Manufacturing Company, Milwaukee, Wis., a corporation of Delaware Application October 14, 1932, Serial No. 637,743

30 Claims. (Cl. 175—183)

This invention relates to improvements in electrical measuring devices and more particularly to means for measuring the energy losses occurring in magnetic materials receiving an alternating magnetic flux.

In the manufacture of magnetic materials and particularly of materials in sheet form, it is not the usual practice to determine the magnetic properties of every individual piece manufactured, because the dimensions of the pieces make it difficult to design suitable apparatus for determining the magnetic properties thereof. The usual practice, therefore, is to determine the magnetic properties of a small sample taken from each heat of material, such sample generally consisting of bundles of strips assembled to constitute the core of a small transformer or so-called Epstein apparatus. Such transformer is energized to induce, in the core thereof, an alternating magnetic flux of predetermined density and frequency and the losses in the core, comprising hysteresis losses and eddy current losses, are measured by well known means such as a wattmeter.

Such procedure is subject to a large number of disadvantages. The sample on which the test is performed must generally be cut to such dimensions that it cannot be further used and must, therefore, be scrapped, thus causing considerable expense for test material where numerous tests are performed. The results of the test are not representative of the losses in the material from which the sample was taken because the magnetic properties of magnetic materials present wide variations between the several pieces manufactured even in a single heat, so that the results of the test are generally misleading. The losses measured by the method referred to above vary in function of the voltage applied to the transformer, and any fluctuations of such voltage are amplified in the readings of the wattmeter, thereby making the results difficult to obtain and of doubtful accuracy. The range of readings given by different samples of the same grade of material extends over only a small portion of the wattmeter scale, so that it is difficult to accurately segregate the different samples giving readings approximately equal. The readings are burdened by including the constant instrument losses which make it necessary to use a wattmeter of too high a range and, therefore, of low accuracy. The sample, being constituted of small pieces, is constituted of material of which a large proportion thereof was distorted in the shearing or punching process, with the results that the magnetic properties of the sample are no longer the same as those of the material from which the sample was obtained.

The above numerous disadvantages are entirely obviated by providing means for energizing each individual piece or sheet of magnetic material for measuring the magnetic loss therein and by providing means for compensating the wattmeter readings through a second current coil provided therein. The efficiency of the measuring system may be further increased by providing means for automatically adjusting the system, for measuring the volume or the weight of the test objects and for automatically separating such objects into groups of different magnetic properties.

It is, therefore, one object of the present invention to provide a system for measuring the magnetic losses of magnetic materials receiving alternating current flux of predetermined density and frequency.

Another object of the present invention is to provide a system for measuring the magnetic losses of magnetic materials in which the readings of the measuring instrument are compensated for the instrument losses.

Another object of the present invention is to provide a system for measuring the magnetic losses of magnetic materials in which the readings of the measuring instrument are compensated for a constant portion of the quantity to be measured.

Another object of the present invention is to provide a system for measuring the magnetic losses of magnetic materials in which the measurements are independent of the variations in the voltage of the source utilized for magnetizing the test object.

Another object of the present invention is to provide a measuring system utilizing a wattmeter having an additional coil for compensating the readings thereof.

Another object of the present invention is to provide a system for measuring the magnetic losses of magnetic materials in which the system is automatically adjusted in response to the dimensions or the weight of the test object.

Another object of the present invention is to provide a system for measuring the magnetic losses of magnetic materials in which the measuring operation is automatically effected.

Another object of the present invention is to provide a system for measuring the magnetic losses of magnetic materials in which the test object is automatically transported through the measuring apparatus.

Another object of the present invention is to provide a system for measuring the magnetic losses of magnetic materials in which the test objects are automatically segregated according to their magnetic properties.

Figure 2:
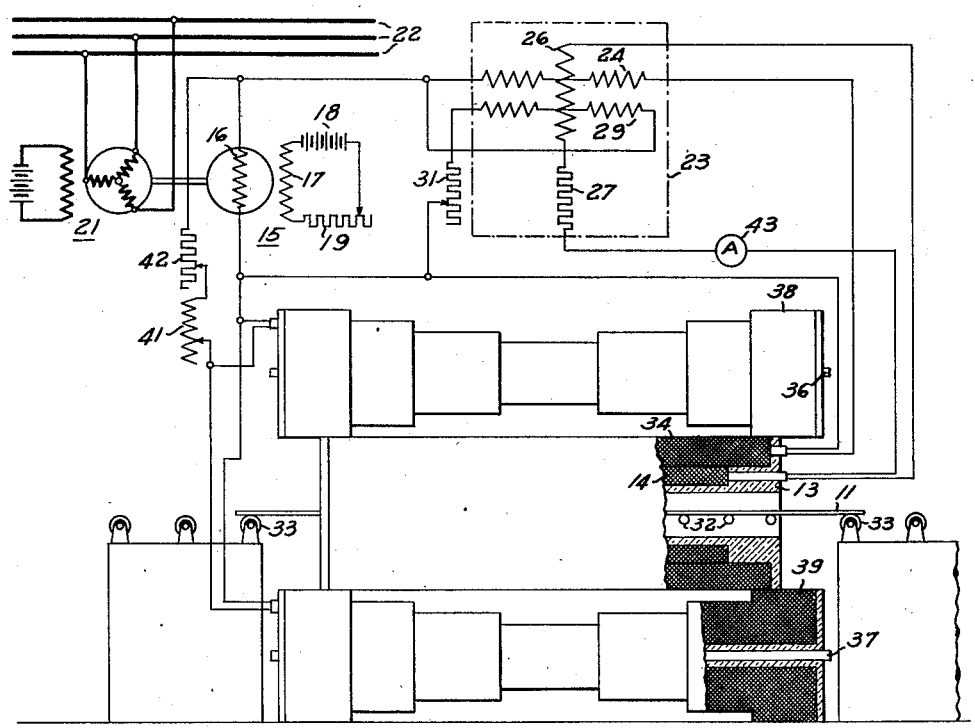
Figure 3:
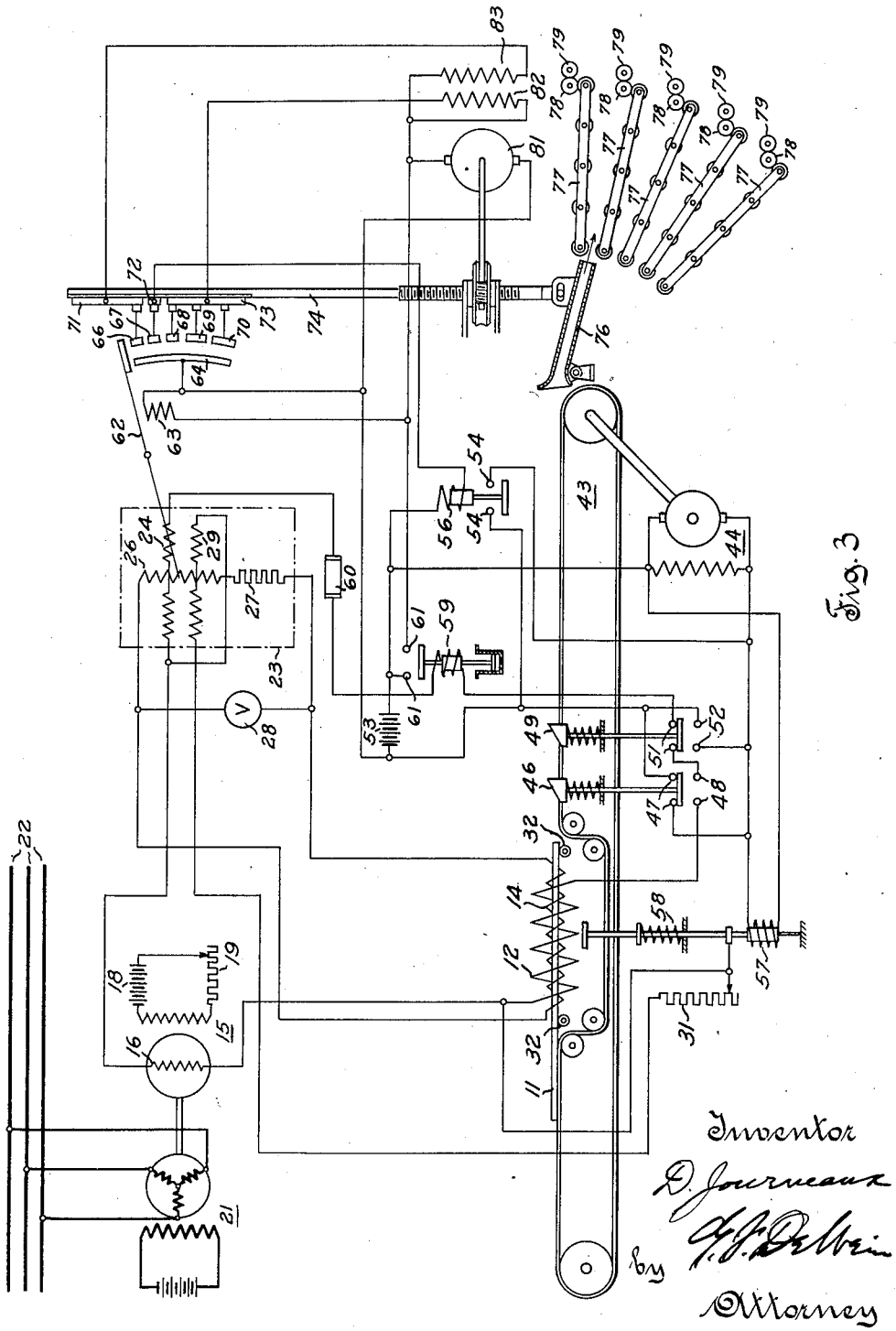
Figure 4:
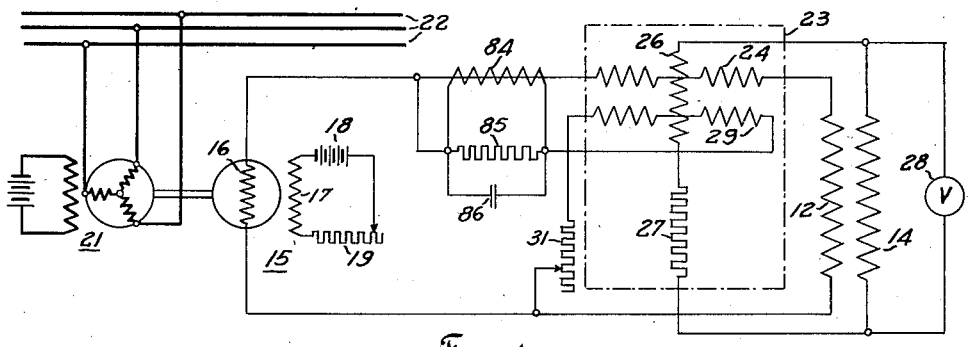
Figure 5:
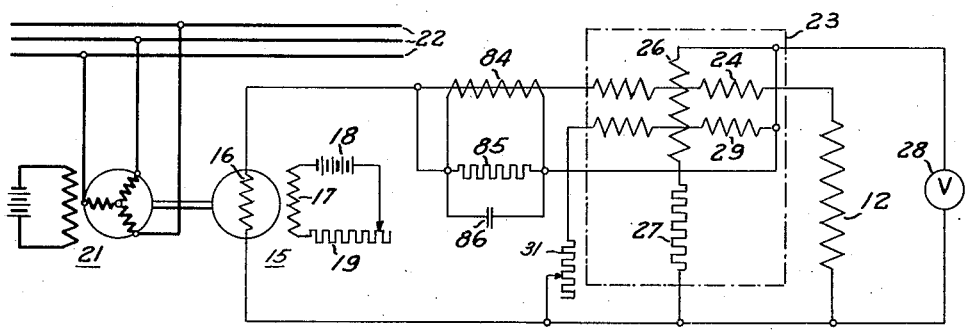
Figure 6:
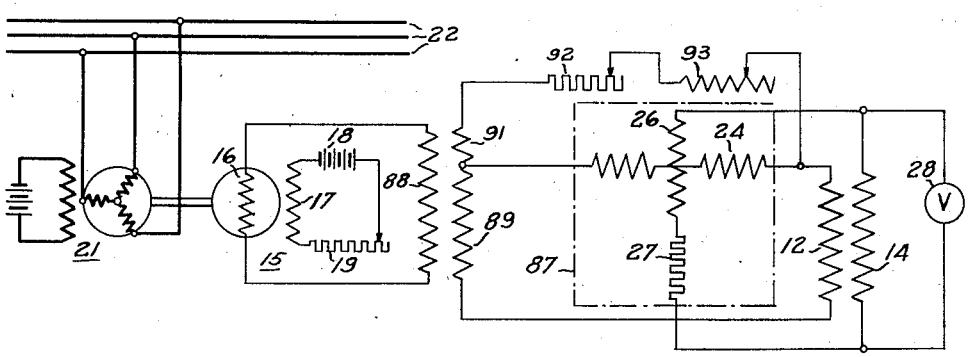

Objects and advantages other than those above described will be apparent from the following description when read in connection with the accompanying drawings, in which:

Fig. 1 diagrammatically illustrates one embodiment of the present invention showing means for measuring the magnetic losses of individual pieces of magnetic material utilizing a wattmeter provided with a coil in addition to the usual coils for compensating the instrument losses and a portion of the losses to be measured and for rendering the readings of the wattmeter independent of voltage variations of the source;

Fig. 2 diagrammatically illustrates a modified embodiment of the present invention differing from that shown in Fig. 1 in the means for obtaining magnetization of the entire test object at a uniform flux intensity;

Fig. 3 diagrammatically illustrates another modified embodiment of the present invention showing means for automatically measuring the magnetic loss of single pieces of magnetic material of different dimensions and for automatically segregating such pieces according to their magnetic properties;

Fig. 4 diagrammatically illustrates the connections of another modified embodiment of the present invention differing from the connections of the embodiment illustrated in Fig. 1 by the addition of error correcting means in the compensating circuit;

Fig. 5 diagrammatically illustrates the connections of a further modified embodiment of the present invention differing from that illustrated in Fig. 4 by the omission of the secondary coil associated with the exciting coil of the test object; and Fig. 6 diagrammatically illustrates the connections of a further modified embodiment of the present invention differing from that illustrated in Fig. 1 in that the connections are such as to permit the use of a wattmeter of the usual type.

Referring to the drawings more particularly by characters of reference, reference numeral 11 designates an object to be tested which is herein shown as being a single piece of magnetic material in sheet form. The test object may, however, consist of a piece of magnetic material of any geometric shape of uniform cross-section such as a bar or a rod. It may be desired to determine the magnetic properties of the test object over its entire length but it will generally be preferable to limit such determination to a fraction of such length which may be the largest portion thereof when the material is in the shape of short straight pieces, or may constitute a small portion of the total length if the material is in rolls or in coils. For the purpose of determining the magnetic losses in the material, the test object must be magnetized over a predetermined portion of its length in such manner as to receive in such length a substantially uniform magnetic flux of predetermined density and frequency, for which purpose the test object is inserted into an exciting winding 12 wound in solenoid fashion on a spool 13 made preferably of non-magnetic and non-conductive material. Spool 13 and coil 12 wound thereon are given a suitable cross-section for the purpose of enclosing test object 11, such cross-section being a flat rectangular shape when the test object is in sheet form. The magnetic circuit of the test object may be closed through suitable magnetic materials but is preferably closed through air so as not to introduce, into the measurements, additional losses which would be caused in such magnetic material and to eliminate lack of uniformity in formation of the joints in the magnetic circuit.

As is well known, when a magnetic object of considerable length is magnetized, the magnetic flux tends to close itself through the surrounding air around the central portion of the test object and means must, therefore, be provided for forcing such magnetic flux to flow through the entire length of the test object or through a predetermined portion of such length. To attain such effect the turns of winding 12 are not uniformly distributed over the length of the spool but are so distributed that the larger number of turns are concentrated over the end portions thereof, thereby forcing the magnetic flux in the test object to flow inside of the end portions of winding 12 and, therefore, also over substantially the entire length of such winding. Winding 12 is preferably made somewhat shorter than the test object so as to magnetize such test object over a distance somewhat smaller than the entire length thereof. The magnetic flux then leaves the test object at a point determined only by the length of winding 12 which point does not depend upon the exact length of the test object and is also not influenced by the exact position of such object.

Spool 13 carries a second winding 14 which may be enclosed within winding 12 and which may have the turns thereof uniformly distributed over its length. It will be understood that winding 14 may also be wound together with winding 12 and may also have the turns thereof concentrated at different points on the spool if desired. Test object 11 and windings 12 and 14 constitute an electric current transformer of which the object 11 constitutes the core. As in the Epstein tester, it is desired to have the secondary winding linking with the entire flux flowing through the test object and, as such flux may close its path in air through the end portions of winding 12, secondary winding 14 is preferably made of shorter length than winding 12 so that all the lines of force present in object 11 pass within every single turn of winding 14. For the purpose of magnetizing test object 11, winding 12 is energized from a source of alternating current supplying an adjustable alternating voltage of constant frequency such as a generator 15 having an armature 16 and a field 17 excited from a battery 18 through a rheostat 19. Generator 15 is driven at constant speed by suitable means such as a synchronous motor 21 energized from an alternating current line 22 in which the voltage is maintained at a closely controlled frequency.

The losses in test object 11 are measured by means of a wattmeter 23 comprising a current coil 24 of the usual construction which is preferably divided into two halves located on each side of the moving element. Such moving element comprises a voltage coil 26 carrying a pointer (not shown in Fig. 1) and in which the current is limited by a resistance or so-called multiplier 27. Winding 14 is connected to energize coil 26 and multiplier 27 and also to supply a volt meter 28. Wattmeter 23 is provided with a second current coil 29 similar in construction to coil 24 but not necessarily wound with wire of the same dimension nor with the same number of turns. Coil 29 is connected so as to receive, from generator armature 16, a current limited by a rheostat 31 but flowing in a direction opposite to the direction of current in coil 24. The handling of the test object may be facilitated by providing spool 13 with rollers 32 and by further providing rollers 33 at each end of the spool so that the test object may be introduced into the coil with a reduced amount of friction. The transfer of the test object may further be aided by gravity, for which purpose the coil may be tilted at an angle.

In operation, the object of which the magnetic properties are to be determined is inserted within spool 13 so that the ends thereof are even with the ends of winding 12 or else protrude beyond such winding by approximately equal amounts. Coil 12 is energized from generator 15 to magnetize test object 11. As will be understood, the alternating magnetic flux thus produced in test object 11 induces a voltage in winding 14 which is proportional to the value of the magnetic flux and of a magnitude such that the voltage induced in each turn of winding 14 is slightly smaller than the voltage applied to each turn of winding 12. Rheostat 19 is then adjusted until voltmeter 28 indicates that test object 11 is magnetized at the desired flux density. Winding 12 then receives a current which may be considered as comprising three components. One component, lagging by 90 degrees behind the induced voltage in coil 14, is the magnetizing component producing the flux in test object 11. The second component is a loss component in phase with the induced voltage of winding 14 due to the magnetic losses within test object 11. A third component in phase is due to the losses within multiplier 27 and within a smaller multiplier constituting a part of voltmeter 28. Winding 14 is so wound that the small current drawn by voltmeter 28 and coil 26 cause only a negligible voltage drop in the winding and the voltage applied to coil 26 and multiplier 27 is hence substantially equal to the induced voltage in coil 14. Under such conditions, the magnetizing current in coil 24 lags 90 degrees behind the current received by coil 26 and does not deflect the pointer of the wattmeter. The loss current of test object 11 and the current supplying the losses to voltmeter 28 and multiplier 27 are in phase with the current of coil 26 and cause the wattmeter to indicate the total value of such aggregate losses. Rheostat 31 is then so adjusted that it receives current equal to the current due to the losses in multiplier 27 and voltmeter 28 so that the action of such currents on coil 26 is compensated and the value of the losses in 27 and 28 is no longer indicated by wattmeter 23.

Rheostat 31 may be further adjusted to receive an additional current somewhat less than the loss current of test object 11, so that wattmeter 23 then only indicates the difference between the actual magnetic losses in test object 11 and the additional constant loss produced in rheostat 31 due to such adjustment. Wattmeter 23 thus reads a much smaller loss than it would without the presence of coil 29 and may therefore be constructed with high sensitivity. In addition, the scale may be calibrated for the range of losses to be obtained in the measurement of the losses in test objects having the lowest losses and test objects having the highest losses, thereby permitting an easy differentiation between losses over the entire scale.

As is well known, the losses in test object 11, when such object is of silicon steel, will vary with a power of the voltage of the source and approximately proportionally with the 1.7 power of such voltage. The losses in multiplier 27, voltmeter 28 and rheostat 31 vary with the square of such voltage. By suitable choice of the different elements involved, it is possible to obtain the result that, for variations of the voltage of the generator 15 of the order of plus or minus 10%, the variation in the losses in test object 11, in voltmeter 28 and multiplier 27 are exactly equal to the variation in the losses in rheostat 31. The difference between such losses, therefore, remains constant and, as wattmeter 23 indicates such difference, its reading will not change during such variations of the voltage of the generator. It will appear that the reading of wattmeter 23 gives the total magnetic loss in the part of test object 11 receiving the magnetic flux. Such loss may then be divided by the volume or by the weight of the portion of the test object involved to obtain the loss per unit weight or per unit volume thereof.

When test objects of different cross-section are to be measured, the voltage of generator 15 may be so adjusted that voltmeter 28 reads a voltage proportional to the cross-section of the test object and the flux density within such object then remains at the predetermined chosen value. It may however be found desirable to leave the voltage of generator 15 unchanged, in which case the test objects of different cross-sections are no longer magnetized at the same flux density. Rheostat 31 may then be adjusted to different values corresponding to the cross-section of the test object, or to the weight of the test object if the latter is of a predetermined length whereupon the wattmeter 23 reads a value substantially equal to the value it would read if rheostat 31 was left unchanged and test object 11 was magnetized at the previous flux density. Such adjustment may also be so made that wattmeter 23 indicates the loss which would be obtained if test object 11 had an arbitrarily chosen cross-section and also was magnetized at the previous flux density. With such adjustment of rheostat 31, the scale of wattmeter 23 may be calibrated to read in terms of losses per unit volume or per unit weight of the test object as the adjustment of rheostat 31 causes the readings to be the same as would be obtained on a sample of predetermined cross-section or weight. It will be understood that such adjustment no longer permits the indications of wattmeter 23 to be of the highest accuracy but the errors introduced by such procedure will generally be very small. The connections of the measuring circuits shown in Fig. 1 were shown as used for the measurement of magnetic losses in a single piece of magnetic material 11 but such connections may be used to advantage in the measurement of losses in any sample of magnetic material by means of suitable exciting coils and may also be used in the measurement of the core losses of electric transformers of the usual construction. In such measurements the primary winding of the transformer is substituted for winding 12 and the secondary winding thereof is substituted for winding 14.

In the embodiment shown in Fig. 2 test object 11 is magnetized by means of a winding 34 differing from winding 12 in that the turns thereof are uniformly distributed over any desired length of the spool 13. Such construction of winding 34 does not insure the uniform magnetization of test object 11 and additional means must be provided to obtain such magnetization. In the present embodiment such means comprise two sheets of magnetic material 36 and 37 located on each side of sheet 11 and magnetized by means of windings 38 and 39 of construction similar to that of winding 12 shown in Fig. 1. Windings 38 and 39 are connected in parallel and may be energized from generator 15 through a rheostat 42 and a variable inductance 41. The magnetic flux in sheets 36 and 37 may thus be adjusted to be exactly in phase with the magnetic flux in sheet 11 and to be of such a magnitude that the flux in sheet 11 must close its path in air entirely outside of coil 34. The exact length of sheet 11 which receives the magnetic flux may be adjusted by a suitable choice of the length of sheets 36 and 37 and of windings 38 and 39. It will be understood that when test object 11 is not in sheet form, core 34 may be surrounded by a plurality of pieces of magnetic material each provided with an exciting winding, thereby providing a continuous magnetic shield on the entire periphery of winding 34. When test object 11 is in sheet form two such magnetic sheets may also be provided on the small sides of winding 34 instead of only on the longer sides thereof but such provision may be found unnecessary.

The operation of the system illustrated in Fig. 2 is similar to that of the system shown in Fig. 1. In the present embodiment, however, voltmeter 28 utilized for measuring the voltage of coil 14 is omitted and is replaced by a milliammeter 43. Milliammeter 43 and multiplier 27 then constitute a voltmeter system similar to that of voltmeter 28 and may be used for measuring the voltage of coil 14. Such a connection presents the advantage that rheostat 31 need compensate only for the loss in multiplier 27 and is relieved of the compensation of voltmeter 28. In addition, winding 14 no longer has to carry the current of voltmeter 28 and may, therefore, be constructed with wire of a smaller cross-section. Although milliammeter 43 is shown as substituted for voltmeter 28 only in the present embodiment such connection may be also used in any of the other embodiments described and may also be used in the measurement of magnetic losses of the usual samples of magnetic materials or in the measurement of core losses of transformers.

In the embodiment illustrated in Fig. 3, test object 11 is shown as being transported through the measuring system by suitable means herein shown as comprising a belt conveyor 45 driven by an electric motor 44. The belt of conveyor 45 may be arranged to extend within coils 12 and 14 but may also be arranged to pass outside of such coils provided that at least one end of the test object is always in contact with the belt. Switch 46 is arranged to be depressed by object 11 when such object reaches the proper position for being magnetized by coil 12, whereupon switch 46 opens its contacts 47 and closes its contacts 48. A second switch 49 may be depressed by object 11 when it has traveled over a short additional distance to open contacts 51 and close contacts 52. A source of current such as battery 53 may be connected through contacts 47 or 52 or through the contacts 54 of a relay 56 to energize motor 44 and to simultaneously energize a solenoid 57. Solenoid 57 maintains a scale 58 of any suitable construction in inoperative position which scale, upon release of the solenoid, lifts the test object out of contact with the conveyor belt to register the weight thereof. Scale 58 also adjusts rheostat 31 to cause wattmeter 23 to indicate the loss per unit weight or per unit volume of test object 11. Scale 58 may also be utilized for adjusting rheostat 19 if it is found that adjustment of rheostat 31 introduces excessive errors into the measuring circuits.

The circuit of coil 12 may be closed through contacts 48 and 51 and includes the coil of a time delay relay 59 and a fuse 60, the purpose of such fuse being to interrupt excessive currents which would flow in winding 12 if such winding were accidentally energized while no test object is located therein. Relay 59 is provided with contacts 61 to permit energization of a solenoid 63 from a battery 53. Solenoid 63 being thus energized attracts the pointer 62 of wattmeter 23 into bridging contact between a sector 64 and one of a number of conductive segments 66, 67, 68, 69 and 70. Such segments may also be conductively connected with brushes 71, 72 and 73 mounted on a rod 74 operable for adjusting the position of a guide 76. Guide 76 is arranged at the end of conveyor 45 for guiding the test objects towards one of a plurality of conveyors 77 herein shown as being of the gravity type to lead the test objects to a different location assigned to test objects of different magnetic properties. Each conveyor may be further provided with a marking roller 78 in contact with an inking roller 79 for the purpose of marking the test objects in accordance with their magnetic properties. Rod 74 may be adjusted through suitable transmission means from a motor having an armature 81 and two oppositely wound field windings 82 and 83 for obtaining rotation of such motor in opposite directions.

In operation, the system being connected as shown, conveyor 45 is driven from motor 44 energized from battery 53 over contacts 47. Solenoid 57 is energized from the same source to maintain scale 58 out of contact with test object 11. When test object 11 reaches switch 46 such switch is depressed to open contacts 47 thereof. Motor 44 is thus deenergized and conveyor 45 stops, leaving test object 11 in the proper position within coil 12 for the measurement of the magnetic losses therein. Solenoid 57 is also deenergized and releases scale 58 which weighs the test object 11 and adjusts rheostat 31 for the proper value. It will be understood that the motion of test object 11 on scale 58 is such as to permit switch 46 to retain its contacts 47 in open position and its contacts 48 in closed position. Contacts 48 being closed, coil 12 is energized from generator 15 through relay 59, fuse 16 and coil 24 of wattmeter 23. Wattmeter 23 moves its pointer 62 to indicate the magnetic loss per unit weight or per unit volume of object 11 in which position it will be opposite a segment such as 69. After a predetermined time delay, relay 59 closes its contacts 61, thereby energizing motor armature 81 and solenoid 63. Pointer 62 is then attracted into bridging contact with sector 64 and segment 69 thereby permitting energization of motor field 82 over brush 73. Motor 81, 82, 83 thus operates to move rod 74 until brush 73 is no longer in contact with segment 69. The motor then stops and leaves guide 76 in such a position as to guide test object 11 to the conveyor 77 corresponding to the reading indicated by wattmeter 23. Brush 72 is then in contact with segment 69 and current flows from battery 53 over segment 64, pointer 62, contact 69, brush 72 and relay 56 and contacts 61. Relay 56 then closes its contacts 54, thereby reenergizing motor 44 and solenoid 57. Scale 58 is thus withdrawn from contact with test object 11 and the conveyor 45 is put back in operation. Test object 11 then depresses switch 49 which opens its contacts 51, thereby deenergizing coil 12 and time delay relay 59 and also closing contacts 52. Relay 59 opens its contacts 61, thereby deenergizing solenoid 63, releasing pointer 62 and opening the circuit of relay 56. Relay 56 opens its contacts 54 through which motor 44 and solenoid 57 were energized but such energization is continued through contacts 52 of switch 49. Motor armature 81 is deenergized through opening of contacts 61. Further motion of test object 11 causes such object to leave switch 46 which releases its contact 47 and reopens its contact 48, thereby providing further energization of motor 44 and solenoid 57 even if the test object has left switch 49 which opens its contact 52 and closes its contact 51. The test object is then guided by guide 76 to the proper conveyor 77 and is marked by roller 78 with the proper indications and forwarded to the proper location. If it is desired to provide for continuous operation of conveyor 45, the present system may be modified so that motor 44 remains continuously energized, the motion of test object 11 then being interrupted by release of scale 58 from its inoperative position and resumed upon reenergization of solenoid 57.

In the embodiment illustrated in Figs. 1, 2 and 3, it was assumed that current for the magnetization of test object 11 was substantially the same for different objects so that the voltage drop in winding 12 due to the flow of such current remains substantially constant and could be provided for by adjustment of the output voltage of generator 15. When such magnetizing current takes different values during operation of the system, the relation between the voltage of winding 14 and the voltage of generator 15 is disturbed and the measurements are erroneous. In the illustrated embodiment in Fig. 4, the circuit of the coil 29 includes a resistance 85 and reactive means such as a condenser 86 connected with one of the terminals of generator 15 and receiving current from a current transformer 84 connected in the circuit of coil 12. The above elements are so dimensioned that the drop in resistance 85 is equal in magnitude and in phase to the voltage drop in winding 12. The voltage applied on rheostat 31 is thus always equal to the voltage of winding 14 even when the current in winding 12 varies so that the compensation due to the current in rheostat 31 always remains at the proper value. The voltage impressed on coil 29 and rheostat 31 being equal to the voltage induced at coil 14, it thus becomes possible to connect voltmeter 28 and coil 26 in parallel with coil 29 and rheostat 31 as shown in Fig. 5. Winding 14 then becomes superfluous and may be omitted.

In the embodiment illustrated in Fig. 6 the wattmeter utilized for the measurement is an instrument 87 of the usual type. The exciting winding 12 is then energized from a secondary winding 89 of a transformer having a primary winding 88 and provided with a second secondary winding 91. Winding 91 supplies current to a rheostat 92, such current flowing through coil 24 in a direction opposite to that of the current drawn by coil 12. If inductance 93 of the figure is omitted, a current flowing from winding 91 through rheostat 92 and coil 24 may be adjusted to be equal to the current drawn from winding 89 to supply voltmeter 28 and coil 26 with multiplier 27, thereby providing compensation of the losses therein. Rheostat 92 may be so further adjusted that it receives current equal to a constant portion of the loss current flowing through coil 24 for compensating a constant portion of the losses in test object 11. By inserting inductance 93 as shown, the current supplied to winding 24 from winding 91 may be shifted in phase to also include a component substantially equal to the magnetizing current drawn by winding 12 from winding 89. Such magnetizing current, which is generally much larger than the loss currents, is then supplied through winding 91 and rheostat 92 and no longer circulates through winding 24. The current in winding 24 is thus reduced to a small value and a winding of a larger number of turns of smaller wire may be used, thereby increasing the sensitivity of the wattmeter.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a system for determining the losses in magnetic materials upon magnetization thereof, a winding arranged to receive materials to be magnetized, a source of periodic electric current connected with said winding, a measuring instrument for determining the magnetic flux in the material to be magnetized, and an instrument for indicating the value of magnetic losses in the material to be magnetized exclusively of other quantities.

2. In a system for determining the losses in magnetic materials upon magnetization thereof, a winding arranged to receive materials to be magnetized, a source of alternating current connected with said winding, a voltmeter for determining the magnetic flux in the material to be magnetized, and an instrument for indicating the value of magnetic losses in the material to be magnetized exclusively of other quantities.

3. In a system for determining the losses in magnetic materials upon magnetization thereof, a winding arranged to receive material to be magnetized and formed to secure a magnetic flux of substantially uniform density within such material over a predetermined portion of the length thereof, and closing the circuit thereof about said winding, a source of alternating current connected with said winding, a measuring instrument for determining the magnetic flux in the material to be magnetized, and an instrument for indicating the value of magnetic losses in the material to be magnetized exclusively of other quantities.

4. In a system for determining the losses in magnetic materials upon magnetization thereof, a winding arranged to receive materials to be magnetized, a source of alternating current of constant frequency connected with said winding, a measuring instrument for determining the magnetic flux in the material to be magnetized, and an instrument comprising elements and connections effective for indicating the value of magnetic losses in the material to be magnetized exclusively of other quantities.

5. In a system for determining the losses in magnetic materials upon magnetization thereof, a winding arranged to receive materials to be magnetized, a source of alternating current of constant voltage connected with said winding, a measuring instrument for determining the magnetic flux in the material to be magnetized, and an instrument having an indicating element operable exclusively in response to the value of the magnetic losses in the material to be magnetized.

6. In a system for determining the losses in magnetic materials upon magnetization thereof, a winding arranged to receive material to be magnetized and formed to secure a magnetic flux of substantially uniform density within such material over a predetermined portion of the length thereof and closing the circuit thereof about said winding, a source of alternating current of constant frequency and constant voltage for energizing said winding, a measuring instrument for determining the magnetic flux in the material to be magnetized, and an instrument for directly determining the value of only a portion of the magnetic losses in the material to be magnetized.

7. In a system for determining the losses in magnetic materials upon magnetization thereof, a winding arranged to receive materials to be magnetized, a source of periodic electric current connected with said winding, a voltmeter for determining the magnetic flux in the material to be magnetized, and a wattmeter for directly indicating the magnitude of the magnetic losses in the material to be magnetized less a predetermined quantity.

8. In a system for determining the losses in magnetic materials, upon magnetization thereof, a winding arranged to receive material to be magnetized and formed to secure a magnetic flux of substantially uniform density within such material over a predetermined portion of the length thereof, and closing the circuit thereof about said winding, a source of alternating current of constant frequency and constant voltage for energizing said winding, a voltmeter for determining the magnetic flux in the material to be magnetized, and a wattmeter for directly determining the value of only a portion of the magnetic losses in the material to be magnetized.

9. In a system for determining the losses in magnetic materials upon magnetization thereof, a hollow spool to receive material to be tested, a plurality of windings arranged in inductive relation upon said spool, a source of alternating current connected with one of said windings, a measuring instrument for determining the magnetic flux in the material to be magnetized, and an instrument for directly determining exclusively the value of a portion of the magnetic losses in the material to be magnetized.

10. In a system for determining the losses in magnetic materials upon magnetization thereof, a hollow spool to receive material to be tested, a source of alternating current, a winding arranged about said spool and connected with said source, a second winding arranged in inductive relation with the first said winding, a measuring instrument connected with said windings for determining the magnetic flux in the material to be magnetized, and an instrument arranged for directly indicating the value of only a portion of the magnetic losses in the material to be magnetized.

11. In a system for determining the losses in magnetic materials upon magnetization thereof, a hollow spool of non-magnetic and non-conductive material to receive material to be tested, a source of alternating current, a winding arranged about said spool and connected with said source, a second winding arranged in inductive relation with the first said winding, the turns of the first said winding being distributed to secure uniform magnetization of the materials to be tested over a predetermined length thereof and closure of the circuit of the magnetic flux about said windings, a measuring instrument connected with said windings for determining the magnetic flux in the material to be tested, and a measuring instrument connected with said windings for directly determining exclusively the value of a portion of the magnetic losses in the material to be magnetized.

12. In a system for determining the losses in magnetic materials upon magnetization thereof, a hollow spool of non-magnetic and non-conductive material to receive material to be tested, a source of alternating current, a winding arranged about said spool and connected with said source, a second winding arranged in inductive relation with the first said winding, the turns of the first said winding being distributed to secure uniform magnetization of the materials to be tested over a predetermined length thereof and closure of the circuit of the magnetic flux about said windings, a voltmeter for determining the magnetic flux in the material to be magnetized, and a wattmeter for directly determining only the value of a portion of the magnetic losses in the material to be tested.

13. In a system for determining the losses in magnetic materials upon magnetization thereof, a hollow spool to receive material to be tested, a source of alternating current, a winding arranged about said spool and connected with said source, a second winding arranged in inductive relation with the first said winding, means associated with said windings to secure uniform magnetization of the material to be tested over a predetermined length thereof and closure of the circuit of the magnetic flux about said windings, a measuring instrument connected with one of said windings for determining the magnetic flux in the material to be magnetized, and an instrument for directly determining only the value of a portion of the magnetic losses in the material to be magnetized.

14. In a system for determining the losses in magnetic materials upon magnetization thereof, a winding arranged to receive materials to be magnetized, a source of periodic electric current connected with said winding, a measuring instrument for determining the magnetic flux in the material to be magnetized, and a wattmeter for directly determining a portion of the magnetic losses in the material to be magnetized, said wattmeter having an additional current coil to compensate for losses in the voltage coils of said measuring instrument and said wattmeter and to compensate for variations in the voltage of said source.

15. In a system for determining the losses in magnetic materials upon magnetization thereof, a hollow spool to receive material to be tested, a plurality of windings arranged in inductive relation upon said spool, a source of alternating current connected with one of said windings, means arranged in the path of the materials to be tested for adjusting the electrical conditions of the system dependent on physical properties of such materials, a measuring instrument for determining the magnetic flux in the material to be magnetized, and an instrument for directly determining a portion of the magnetic losses in the material to be magnetized.

16. In a system for determining the losses in magnetic materials upon magnetization thereof, a hollow spool to receive material to be tested, a plurality of windings arranged in inductive relation by said spool, a source of alternating current connected with one of said windings, means arranged in the path of the materials to be tested for adjusting the electrical conditions of the system dependent on the weight of such materials, means associated with the first said means for determining the weight of the materials to be tested, a measuring instrument for determining the magnetic flux in the material to be magnetized, and an instrument for directly determining a portion of the magnetic losses in the material to be magnetized.

17. A method for determining the magnetic properties of materials comprising arrangement of the materials to be tested within a magnetizing winding, supplying the winding with periodic electric current, measuring the magnetic flux in the material to be tested, and measuring exclusively the value of magnetic losses in the material to be tested.

18. A method for determining the magnetic properties of materials comprising arrangement of the materials to be tested within a magnetizing winding, supplying the winding with periodic electric current, measuring an electric quantity representative of the value of the flux in the material to be tested, and directly measuring only the value of the magnetic losses in the material to be tested less a predetermined quantity.

19. A method for determining the magnetic properties of materials comprising arrangement of the materials to be tested within a magnetizing winding, supplying the winding with periodic electric current, measuring an electric quantity proportional to the flux in the material to be tested, directly measuring a portion of the magnetic losses in the material to be tested, and compensating for all unmeasured portions of the losses involved in operation of the method.

20. A method for determining the magnetic properties of materials comprising arrangement of the materials to be tested within a magnetizing winding, supplying the winding with periodic electric current, measuring an electric quantity proportional to the flux in the material to be tested, directly measuring a portion of the magnetic losses in the material to be tested, and compensating for the unmeasured portion of the losses in the material to be tested.

21. A method for determining the magnetic properties of materials comprising arrangement of the materials to be tested within a magnetizing winding, supplying the winding with periodic electric current, measuring an electric quantity proportional to the flux in the material to be tested, directly measuring the value of only a portion of the magnetic losses in the material to be tested, and automatically compensating for fluctuations of the voltage of the current supplied to the magnetizing winding and for the losses in the means for measuring the flux and the magnetic losses.

22. A method for determining the magnetic properties of materials comprising arrangement of the materials to be tested within a magnetizing winding, supplying the winding with periodic electric current, measuring an electric quantity proportional to the flux in the material to be tested, directly measuring a portion of the magnetic losses in the material to be tested, compensating for the unmeasured portion of the losses in the material to be tested, and automatically adjusting the measurements of the flux and of the magnetic losses dependent on physical characteristics of the material to be tested.

23. A method for determining the electrical properties of materials to be tested comprising subjecting the material to be tested to a magnetic field produced by an electric current, measuring the effect of the magnetic field in the material to be tested, and supplying an additional coil in the measuring instrument with an additional electric current to automatically compensate the measurements for variations therein due to the effect of the electric current on objects other than the material to be tested.

24. A method for determining the electrical properties of materials to be tested comprising subjecting the material to be tested to a magnetic field produced by an electric current, measuring the effect of the magnetic field in the material to be tested, and supplying an additional electric current to a coil of a measuring instrument to automatically compensate the measurements for variations therein due to the effect of the electric current on objects other than the material to be tested.

25. A method for determining the magnetic properties of materials to be tested comprising subjecting the material to be tested to a magnetic field produced by an exciting current having a magnetizing component, measuring the effect of the magnetic field in the material to be tested, and supplying the magnetizing current component less a constant quantity to the measuring instruments.

26. A method for determining the electrical properties of materials to be tested comprising subjecting the material to be tested to a magnetic field produced by an electric current, measuring the effect of the magnetic field in the material to be tested, and automatically adjusting the measuring circuits for correcting the readings to apply to material of predetermined dimensions to be tested.

27. A method for determining the magnetic properties of materials comprising arrangement of the materials to be tested within a magnetizing winding, supplying the winding with periodic electric current, arranging magnetic shields about the winding, magnetizing the magnetic shields, and measuring the magnetic losses in the material to be tested.

28. In a system for determining the losses in magnetic materials upon magnetization thereof, a hollow spool to receive material to be tested, a source of alternating current, a winding arranged about said spool and connected with said source, a second winding arranged in inductive relation with the first said winding, magnetic shields arranged about said windings, means for magnetizing said shields to cause uniform magnetization of the material to be tested, a measuring instrument connected with one of said windings for determining the magnetic flux in the material to be magnetized, and an instrument for directly determining only the value of a portion of the magnetic losses in the material to be magnetized.

29. A method for determining the electrical properties of materials to be tested comprising subjecting the material to a magnetic field produced by an electric current supplied at constant voltage, measuring the effect of the magnetic field in the material, and automatically compensating the measurements for errors resulting from variation of the magnitude of the current in dependence upon the properties of the material.

30. A method for determining the magnetic properties of materials comprising arrangement of the material to be tested within a magnetizing winding, measuring an electric quantity representative of the value of the flux in the material to be tested, supplying the winding with periodic electric current, measuring the magnetic flux in the material to be tested, and measuring the value of magnetic losses in only the material to be tested.

DIDIER JOURNEAUX.